(12) United States Patent
Sapir et al.

(10) Patent No.: US 12,301,624 B2
(45) Date of Patent: May 13, 2025

(54) SYSTEM AND METHOD FOR DYNAMIC RESOLUTION OF STANDARD COMPLIANCE

(71) Applicant: Dell Products L.P., Round Rock, TX (US)

(72) Inventors: Stav Sapir, Beer Sheba (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 18/304,760

(22) Filed: Apr. 21, 2023

(65) Prior Publication Data

US 2024/0356974 A1 Oct. 24, 2024

(51) Int. Cl.
*H04L 29/06* (2006.01)
*H04L 9/40* (2022.01)

(52) U.S. Cl.
CPC .................... *H04L 63/20* (2013.01)

(58) Field of Classification Search
CPC ..... H04L 63/20; H04L 63/10; H04L 63/0263; H04L 63/0227; G06F 21/70; G06F 21/50
See application file for complete search history.

(56) References Cited

U.S. PATENT DOCUMENTS

| | | | |
|---|---|---|---|
| 8,104,077 B1 * | 1/2012 | Gauvin | H04L 65/1079 726/23 |
| 8,584,247 B1 | 11/2013 | Patil | |
| 8,590,050 B2 | 11/2013 | Nagpal | |
| 8,788,442 B1 * | 7/2014 | Sculley, II | G06N 20/00 706/20 |
| 8,910,241 B2 | 12/2014 | Pollutro | |
| 10,318,628 B2 | 6/2019 | Le Bescond de Coatpont | |
| 11,184,404 B1 | 11/2021 | Hatch | |
| 11,256,777 B2 | 2/2022 | Brannon et al. | |
| 2013/0104236 A1 * | 4/2013 | Ray | H04L 63/20 726/25 |
| 2018/0176254 A1 | 6/2018 | Lam | |
| 2018/0322510 A1 | 11/2018 | Cleaver | |
| 2019/0354690 A1 | 11/2019 | Brigandi | |
| 2020/0358826 A1 | 11/2020 | Helander | |
| 2022/0094596 A1 | 3/2022 | Jagannathan | |

(Continued)

OTHER PUBLICATIONS

"Microsoft Purview Compliance Manager," Web Page <https://learn.microsoft.com/en-us/microsoft-365/compliance/compliance-manager?view=o365-worldwide> accessed on Jan. 7, 2023.

(Continued)

*Primary Examiner* — Longbit Chai
(74) *Attorney, Agent, or Firm* — WOMBLE BOND DICKINSON (US) LLP

(57) ABSTRACT

Methods and systems for managing computing infrastructure compliance with standards are disclosed. The computing infrastructure may provide computer implemented services that may be at elevated risk if the computing infrastructure fails to comply with various standards such as security or redundancy standards. To manage compliance with standards, a cross-standard compliance coverage model may be used. The cross-standard compliance coverage model may use information regarding infrastructure components of the computing infrastructure to ascertain compliance with any number of standards.

20 Claims, 8 Drawing Sheets

(56) References Cited

U.S. PATENT DOCUMENTS

| | | |
|---|---|---|
| 2023/0275932 A1 | 8/2023 | Brotherson |
| 2023/0283643 A1 | 9/2023 | Manuel-Devadoss |
| 2024/0061939 A1 | 2/2024 | Pieczul |
| 2024/0311208 A1 | 9/2024 | Kandasamy |

OTHER PUBLICATIONS

"Configuration Analyzer for Microsoft Purview (CAMP)," Web Page <https://learn.microsoft.com/en-us/microsoft-365/compliance/compliance-manager-mcca?view=o365-worldwide> accessed on Jan. 7, 2023.

"GDPR Compliance Software," Web Page <https://www.solarwinds.com/access-rights-manager/use-cases/gdpr-compliance-software> accessed on Jan. 7, 2023.

"Understanding the NIST 800-53 Risk Management Framework," Web Page <https://www.apptega.com/frameworks/hist-800-53-compliance> accessed on Jan. 7, 2023.

\* cited by examiner

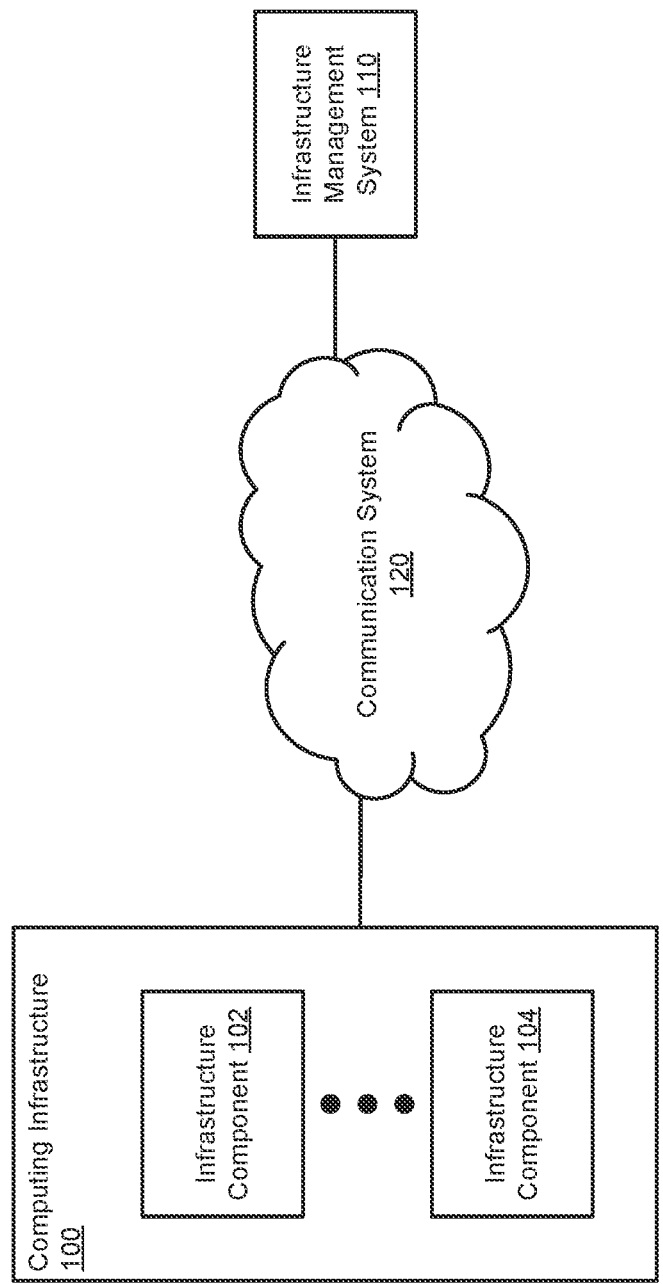

SYSTEM AND METHOD FOR DYNAMIC RESOLUTION OF STANDARD COMPLIANCE

FIELD

Embodiments disclosed herein relate generally to security. More particularly, embodiments disclosed herein relate to systems and methods to secure distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
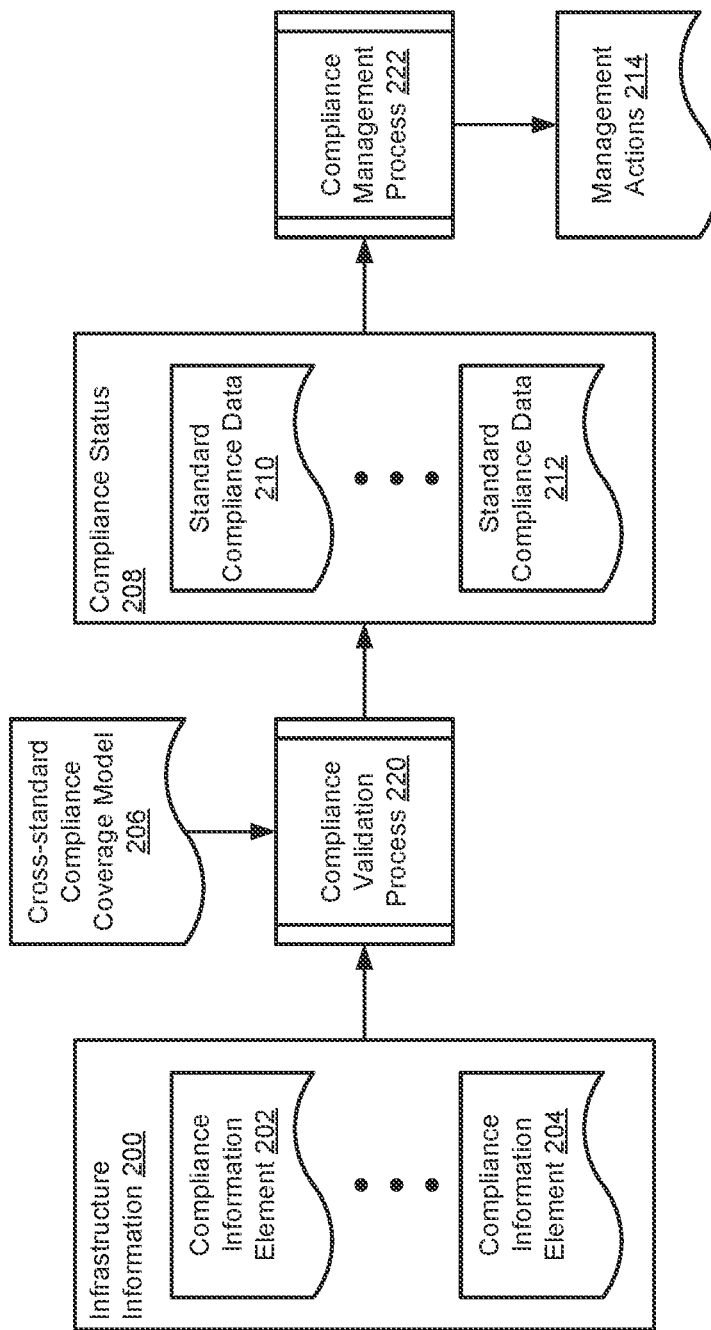
FIGS. 2A-2D show data flow diagrams illustrating data flows in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing computing infrastructure. The computing infrastructure may provide computer implemented services. Providing the computer implemented services may present risk of undesired disclosure of data and/or other undesired outcomes.

To mitigate the risks, various standards for infrastructure components of the computing infrastructure may be enforced. The standards may specify various requirements for the infrastructure components.

To manage compliance with the standards, a cross-standard compliance coverage model may be used. The cross-standard compliance coverage model may use information regarding the infrastructure components to ascertain whether the computing infrastructure meets the standards.

To obtain the information used by the cross-standard compliance coverage model, agents may be deployed and configured based on mappings included in the cross-standard compliance coverage model. The agents may monitor the infrastructure components and generate compliance information elements.

The compliance information elements may include information usable to ascertain whether the infrastructure component complies with various portions of different standards (e.g., security standards, redundancy standards, etc.). The information may be used to update the cross-standard compliance coverage model in near real time. Consequently, changes in compliance with any number of standards may be identified for computing infrastructure.

When changes in compliance are identified, various actions may be performed to manage the impact of the changes in compliance. By doing so, embodiments disclosed herein may provide computing infrastructure that is less likely to suffer from risks in providing computer implemented services.

In an embodiment, a method for managing computing infrastructure is disclosed. The method may include obtaining a compliance information element for an infrastructure component of the computing infrastructure; dynamically processing the compliance information element to update a cross-standard compliance coverage model to obtain an updated cross-standard compliance coverage model; obtaining compliance standard data for a security standard enforced on the infrastructure using the updated cross-standard compliance coverage model; making a determination, based on the compliance standard data, when the infrastructure has undergone a change in compliance with the security standard; in an instance of the determination where the infrastructure has undergone a change in compliance with the security standard: performing an action set to manage an impact of the change in compliance with the security standard.

The compliance information element may be based on at least one mapping of the cross-standard compliance coverage model, the mapping associating the compliance information element with at least one portion of the security standard.

The mapping may further specify a basis for a portion of a state of the cross-standard compliance coverage model associated with the portion of the security standard on the compliance information element.

Dynamically processing the compliance information element may include updating the portion of the state using the basis and the compliance information element; and updating a second portion of the state using a second basis associated with a second mapping of the cross-standard compliance coverage model and the compliance information element.

The second portion of the state may be associated with a portion of second security standard that is different from the security standard.

The method may also include, prior to obtaining the compliance information element: identifying the infrastructure component for standard monitoring; identifying the mapping as being related to the infrastructure component; generating a configuration for an agent for the infrastructure component; and updating operation of an instance of the agent associated with the infrastructure component based on the configuration.

Updating the operation of the instance of the agent may include specifying collection, by the instance of the agent, of a configuration of the infrastructure component; specifying collection, by the instance of the agent, a state of the infrastructure component; specifying collection, by the instance of the agent, an audit result for the infrastructure component; and specifying generation, by the instance of the agent, of the compliance information element based on the configuration, the state, and/or the audit result.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, data acquisition services, communication services, and/or any other type of service that may be implemented with a computing device.

To provide the computer implemented services, the system of FIG. 1 may include computing infrastructure 100. Computing infrastructure 100 may include any number of infrastructure components 102-104 that may provide the computer implemented services. The infrastructure components may cooperatively and/or independently provide all, or portions, of the computer implemented services.

While providing the computer implemented services, infrastructure components 102-104 may (i) be subject to interference (e.g., attacks) by malicious entities, (ii) be subject to errors in processing or other issues, etc. The interference, errors in processing, and/or other issues arising in the computer implemented services may cause the computer implemented services to diverge from nominal performance. For example, the interference by malicious entities may cause data that would otherwise remain private to be disclosed to entities that are not authorized to access the data. Similarly, errors in processing may cause some data that may otherwise be expected to be accessible in the future to become inaccessible (e.g., due to corruption, etc.).

To manage impacts of interference, errors in processing, and/or other issues, various standards for operation of computing infrastructure 100 may be established. The standards may relate to, for example, security, reliability, regulatory requirements, and/or other aspects regarding the operation and/or expectations for operation of infrastructure components 102-104.

However, the standards for operation of computing infrastructure 100 may not explicitly specify how the infrastructure components are to operate. Rather, the standards may set expectations or goals, but may also not specify how to identify whether the standards or expectations are met. Further, different standards may specify the standards and/or expectations in different manners.

Additionally, failure to comply with any of the standards for any duration of time may not be acceptable. For example, the standards may specify that the standards and expectations are to be continually met.

In general, embodiments disclosed herein may provide methods, systems, and/or devices for providing computer implemented services that are more likely to be provided in manners that comply with any number of standards. The disclosed systems may provide the computer implemented services using a standards management framework. The standards management framework may measure compliance of infrastructure components used to the provide the computer implemented services with corresponding standards. If the operation of the infrastructure components diverges from the standards, then the system of FIG. 1 may take action to manage impact of the divergence of the operation of the infrastructure components from the standard.

By doing so, a system in accordance with embodiments disclosed herein may be more likely to provide computer implemented services in a manner that meets any number of standards. The system may do so by continuously monitoring for compliance with the standards. By continuously monitoring, the resulting computer implemented services may be more likely to be nominal in performance. Thus, embodiments disclosed herein may address, among others, the technical problem of security in distributed systems. The disclosed embodiments may address security in distributed systems through dynamic analysis of compliance with any number of standards for infrastructure components that provide computer implemented services.

To provide the above noted functionality, the system of FIG. 1 may include computing infrastructure 100 and infrastructure management system 110. Each of these components is discussed below.

Computing infrastructure 100 may provide the computer implemented services. To do so, computing infrastructure 100 may include any number of infrastructure components 102-104. The infrastructure components may objects that contributes to performance of the computer implemented services and that may be monitorable. For example, any of the infrastructure components may include hosted entities (e.g., executing programs, data structures, etc.) and/or host devices (e.g., hardware such as data processing systems) that contribute to performance of the computer implemented services.

Figure 2B:
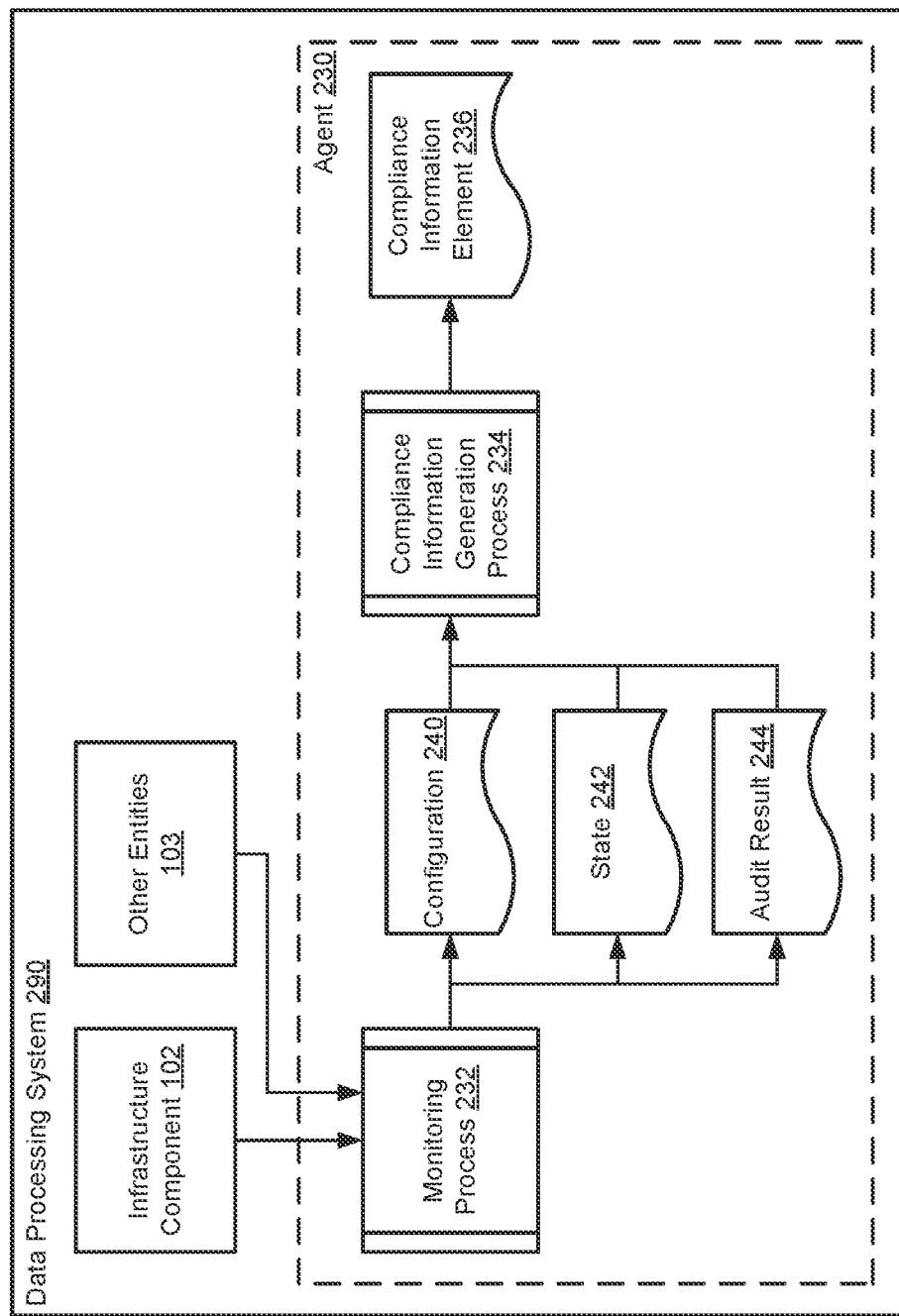
Figure 2C:
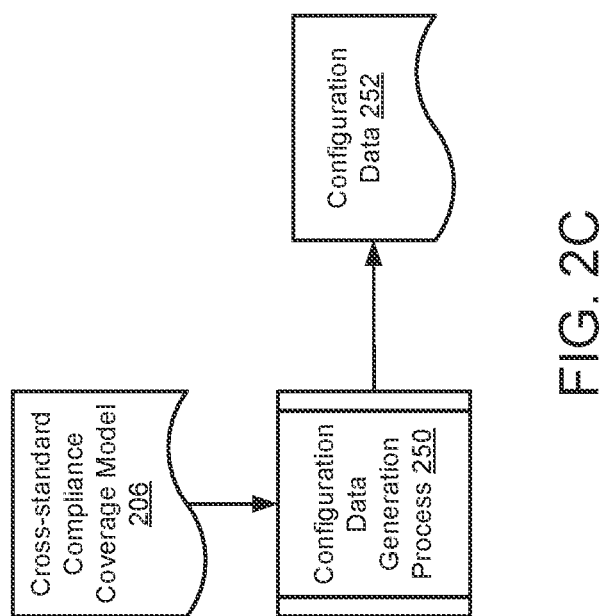
Figure 2D:
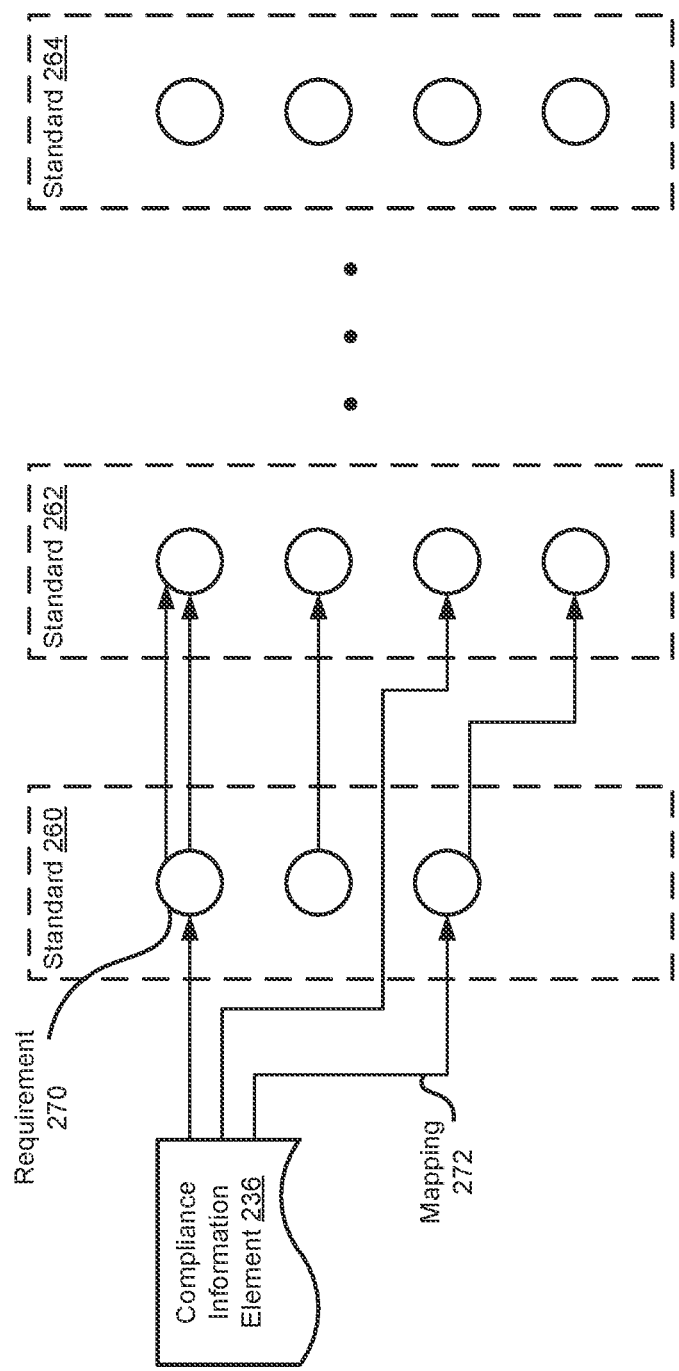

The operation of the infrastructure components may be subject to any number of standards (e.g., that attempt to retain performance of computer implemented services in a nominal manner). To identify whether the operation of the infrastructure components indicates compliance or non-compliance with any of the standards, agents may monitor the infrastructure components. Through the monitoring, information (e.g., facts) relevant to whether standards are complied with or violated by the computing infrastructure may be obtained. Refer to FIGS. 2B-2D for additional details regarding obtaining of relevant information for infrastructure components.

Infrastructure management system 110 may monitor computing infrastructure 100 for compliance with any number of standards, and may take action to manage impacts of non-compliance of computing infrastructure 100. By doing so, the computer implemented services provided by computing infrastructure 100 may be more likely to be provided in a nominal manner.

To monitor computing infrastructure 100 for compliance, infrastructure management system 110 may (i) deploy and use agents to collect information from infrastructure components 102-104, (ii) use the collected information to update a cross-standard compliance coverage model, (iii) use the updated cross-standard compliance coverage model to ascertain whether computing infrastructure 100 is in or out of compliance with any number of standards, and/or (iv) initiate performance of any number of actions to manage impacts of compliance failures by computing infrastructure 100. Refer to FIG. 2C for additional details regarding deploying agents. Refer to FIGS. 2A and 2D for additional details regarding updating of cross-standard compliance coverage models and identifying standard compliance.

Figure 3:
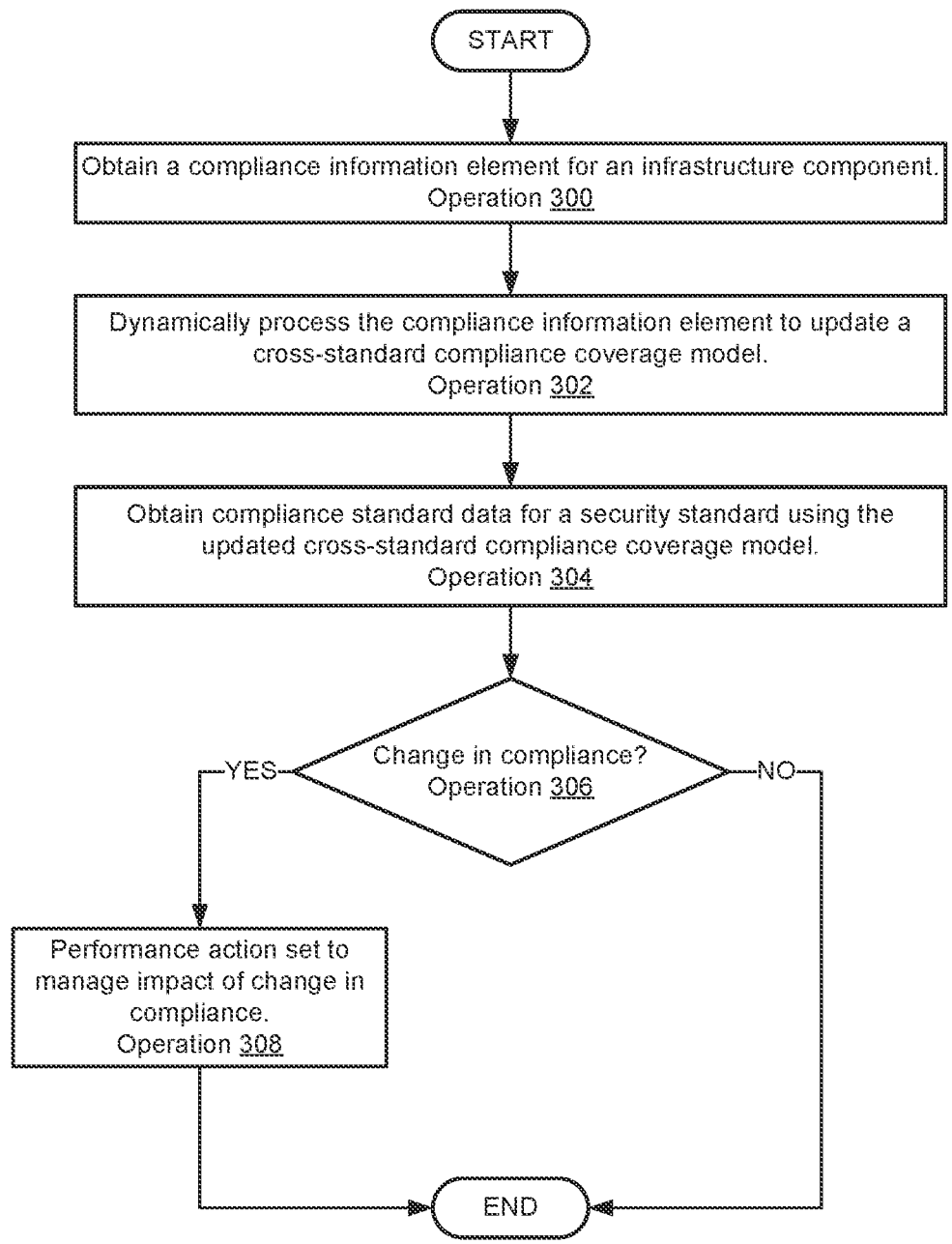
FIGS. 3-4 show flowchart diagrams illustrating methods in accordance with an embodiment.
Figure 4:
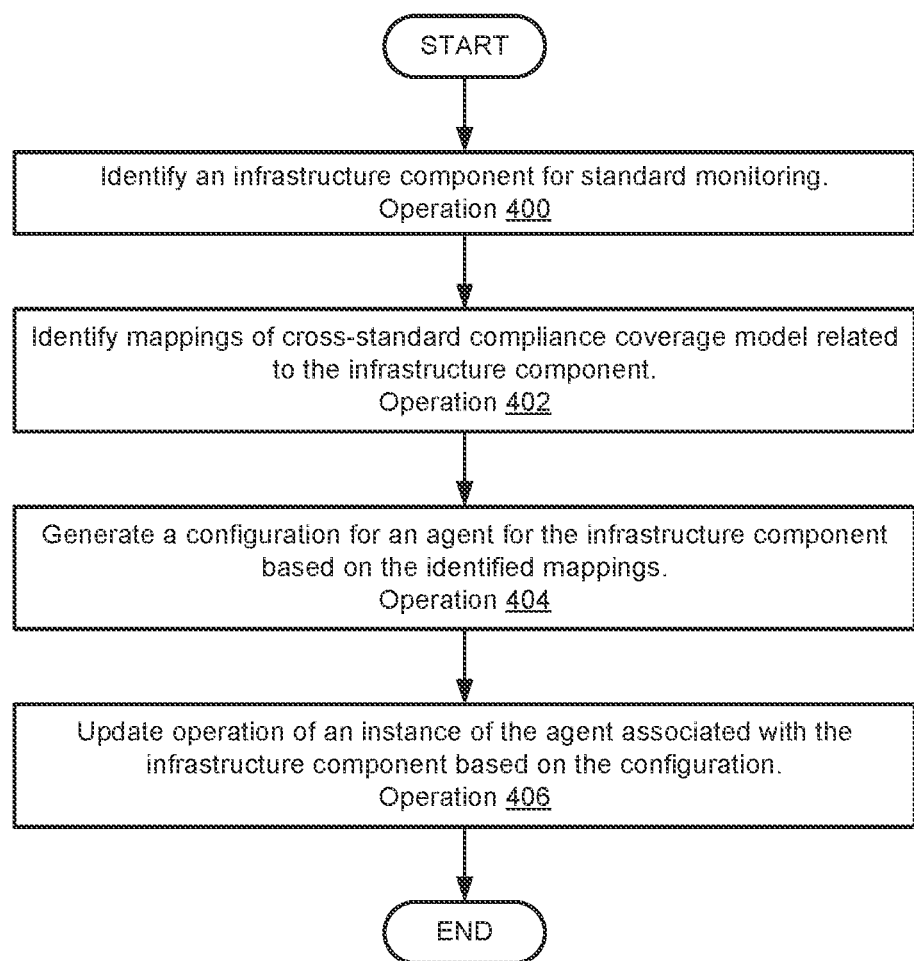

When providing their functionality, any of computing infrastructure 100 and infrastructure management system 110 may perform all, or a portion, of the methods illustrated in FIGS. 3-4.

Any of computing infrastructure 100 and infrastructure management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of computing infrastructure 100 and/or other components not shown in FIG. 1. Any of the instances may perform similar and/or different functions performed by other instances.

Turning to FIG. 2A, a first data flow diagram in accordance with an embodiment is shown. In the data flow diagram, flows of data and processing of data are illustrated. Processes (e.g., executing software) are illustrated using a first set of elements (e.g., 220, 222) and data structures (e.g., tables, linked lists, databases, etc.) are illustrated using a second set of elements (e.g., 200-214). Similar elements are used in FIGS. 2B-2C to distinguish processes and data structures in data flow diagrams.

To ascertain compliance of computing infrastructure with any number of standards, infrastructure information 200 may be obtained. Infrastructure may include any number of compliance information elements (e.g., 202-204). Compliance information elements 202-204 may include information regarding an infrastructure component. The information may be mapped by cross-standard compliance coverage model 206 to portions of any number of standards (e.g., security standards, operational standards, regulatory standards, etc.). The mappings may also indicate how the content of each compliance information element shows either compliance or non-compliance with the corresponding portions of the standards.

Infrastructure information 200 may be obtained by receiving it from agents that monitor the infrastructure components. Refer to FIG. 2B for additional details regarding compliance information elements 202-204.

Infrastructure information 200 may be used in compliance validation process 220 to (i) update a state of cross-standard compliance coverage model 206 and (ii) establish compliance status 208. For example, compliance validation process 220 may use the mappings of cross-standard compliance coverage model to process compliance information elements 202-204. The processing may establish whether each compliance information element indicates whether the computing infrastructure complies with corresponding portions of standards. The state of cross-standard compliance coverage model 206 may be updated based on the determined compliance of the computing infrastructure. Thus, the state of cross-standard compliance coverage model 206 may indicate compliance and non-compliance with any number of portions of any number of standards. Refer to FIG. 2D for additional details regarding the state of cross-standard compliance coverage model 206.

The state of cross-standard compliance coverage model, once updated, may be used to generate compliance status 208 as part of compliance validation process 220. Compliance status 208 may reflect compliance of the computing infrastructure with respect to any number of standards.

Compliance status may include any amount of standard compliance data 210-212. Each portion of standard compliance data may indicate compliance with portions of a standard. For example, standard compliance data 210 may be a data structure that specifies which portions of a standard that computing infrastructure is in compliance with and other portions of the standard that computing infrastructure is out of compliance with.

For example, one of the standards may be the National Institutes of Standards and Technology 800-53 standard, which sets expectations regarding computing infrastructure for security purposes. A corresponding standard compliance data (e.g., 210) for the 800-53 standard may indicate which portions of the standard the computing infrastructure is in compliance and other portions of the standard that the computing infrastructure is out of compliance. Different standard compliance data may correspond to different standards.

Once generated, compliance status 208 may be used in compliance management process 222 to manage impacts of compliance failures. For example, during compliance management process 222, various actions keyed to compliance failures specified by compliance status 208 may be performed to attempt to manage the impact of these compliance failures. The actions may include, for example, sending various notifications, modifying operation of infrastructure components of the computing infrastructure, disabling various infrastructure components, etc.

To implement the actions, compliance management process 222 may generation management actions 214. Management actions 214 may specify actions (e.g., to manage the impact) to be performed by various entities. Management actions 214 may be distributed to corresponding entities that will perform the actions. Once distributed, the actions may be performed by the entities.

Turning to FIG. 2B, a second data flow diagram in accordance with an embodiment is shown. In the data flow diagram, flows of data and processing of data are illustrated. To acquire information usable to ascertain whether computing infrastructure is incompliance with standards, an agent 230 may be utilized.

For example, infrastructure component 102 may be hosted by data processing system 290. Other entities 103 may also be hosted by data processing system 290. The other entities may include, for example, operating systems, drivers, applications, etc.

Agent 230 may perform monitoring process 232 with respect to infrastructure component 102 and other entities 103. During monitoring process 232 information regarding operation of infrastructure component 102 and other entities 103 may be collected. Through monitoring process 232, configuration 240, state 242, and audit result 244 may be obtained.

Configuration 240 may include information regarding the configuration of infrastructure component 102 and/or other entities 103. The configuration may reflect various operations that may be selected and which influence operation of infrastructure component 102 and other entities 103 (e.g., such as requirements for use of secure connections, encryption, etc.). This information may be obtained by, for example, reading it from files that define configurations, requesting it from infrastructure component 102 and/or other entities 103, and/or via other methods.

State 242 may include information regarding the state of infrastructure component 102 and/or other entities 103. The state may reflect the operating state of infrastructure component 102 and other entities 103, and/or the state of the hardware support operation of infrastructure component 102 and/or other entities. This information may be obtained by, for example, requesting from management entities such as operating systems, requesting it from hardware components, reading various registers and/or files, and/or via other data collection methods.

Audit result 244 may include information regarding an outcome of an audit process performed on data processing system 290 and/or hosted entities. The audit process may be performed by agent 230 and/or other entities (e.g., another application may perform it at the request of agent 230). The audit result may reflect whether and to what extent data processing system and/or hosted entities passed the audit, or portions thereof. This information may be obtained by, for example, receiving it from another entity, through performance of the audit process, and/or via other data collection methods.

The information obtained through monitoring process 232 may be used to obtain compliance information element 236. For example, compliance information generation process 234 may ingest the information and generate compliance information element 236. Compliance information element 236 may be a data structure having a standardized format that allows for relevant mappings maintained by the cross-standard compliance coverage model to be identified and used to update the state of the cross-standard compliance coverage model.

The specific quantities monitored by monitoring process 232 and the information included by compliance information element 236 may be configured. Refer to FIGS. 2C-2D for additional details regarding configuration for compliance information element generation.

Once obtained, compliance information element 236 may be provided to infrastructure management system 110 for updating of the cross-standard compliance coverage model.

Turning to FIG. 2C, a third data flow diagram in accordance with an embodiment is shown. In the data flow diagram, flows of data and processing of data are illustrated. To acquire information usable to update the state of cross-standard compliance coverage model, an agent may be configured using configuration data 252.

Configuration data 252 may specify the information to be monitored by an agent, and how the information is to be used to generate compliance information elements. Configuration data 252 may be generated through configuration data generation process 250.

Configuration data generation process 250 may be performed when a new infrastructure component is identified for compliance monitoring. When new infrastructure components are identified, configuration data generation process 250 may be performed. During configuration data generation process 250, mappings from cross-standard compliance convergence model that specify the information which needs to be included in compliance information elements from the infrastructure component may be identified. Different mappings may be tagged with respect to different infrastructure components such that relevant mappings may be identified based on the infrastructure components. The identified mappings may be used to identify the content and format of the compliance information elements.

A procedure library or other data structure which defines monitoring procedures based on information to be included in compliance information elements may be used to identify monitoring procedures to be implemented by corresponding agents.

Once the procedures and informational content for compliance information elements, then configuration data 252 may be generated. After generation, configuration data 252 may be used to configure a corresponding agent. For example, configuration data 252 may be sent to the agent. The agent may configure its operation based on configuration data 252.

Turning to FIG. 2D, a fourth data flow diagram in accordance with an embodiment is shown. In the data flow diagram, flows of data and processing of data are illustrated. Additionally, various standards 260-264 of the cross-standard compliance coverage model are illustrated using a series of circles. Each circle corresponds to a portion of the respective standard (which may specify any number of requirements (e.g., 270) for compliance with the portion of the standard), and each circle is associated with a portion of the state of the cross-standard compliance coverage model. While illustrated with a finite number of circles corresponding to portions of standards, it will be appreciated that a standard may include any number of portions.

Additionally, in FIG. 2D, lines terminating in arrows represent mappings (e.g., 272) that define relationships between information and portions of the state of cross-standard compliance coverage model. For example, each mapping may specify (i) information on which a portion of the state is based, (ii) rules for identify the portion of the state based on the information, (iii) identities of infrastructure components to which the mapping is applicable, and/or other information usable to identify relevant information and identify portions of the state of the cross-standard compliance coverage model.

For example, a mapping may specify that (i) information regarding ports is relevant, (ii) that the ports must be inactive to comply with the portion of the standard, and (iii) the mapping is relevant to network components of computing infrastructure. In this example, configuration information for an agent may be generated that specifies collection of the information regarding the ports, and inclusion of the information in a compliance information element (e.g., 236).

When received by infrastructure management system 110, the information element may be processed based on the rules specified in the mapping. In this example, the rules may specify that the computing infrastructure is in or out of compliance depending on whether the port is open. For purposes of example, if mapping 272 specifies that the port is to be closed, but compliance information element 236 specifies that the port is open, then the portion of the state associated with standard 260 may be modified to reflect that the computing infrastructure is out of compliance.

Other mappings of the cross-standard compliance coverage model may specify that some portions of standards depend on compliance with portions of other standards. For example, in FIG. 2D, some arrows representing mappings extend from the representation of the portion of standard 260 to the representations of the portions of standard 262. These two standards may be different, but may define compliance with portions of standard 262 in terms of compliance with portions of standard 260. In this manner, the cross-standard compliance coverage model may propagate changes in compliance across multiple standards. Accordingly, when standard compliance data (e.g., 210) is generated for a standard, the information maintained by the cross-standard compliance coverage model regarding the standard may be kept up to date.

The mappings of the cross-standard compliance coverage model may be established by, for example, subject matter experts. As standards are added or removed from the cross-standard compliance coverage model, the mappings may be correspondingly updated.

As discussed above, the components of FIG. 1 may perform various methods to manage the compliance with various standards to improve the likelihood of desirable computer implemented services being provided. FIGS. 3-4 illustrate methods that may be performed by the components of the system of FIG. 1. In the diagrams discussed below and shown in FIGS. 3-4, any of the operations may be repeated, performed in different orders, and/or performed in parallel with or in a partially overlapping in time manner with other operations.

Turning to FIG. 3, a flow diagram illustrating a method for managing the impact of changes in compliance with standards in accordance with an embodiment is shown. The method may be performed in part by computing infrastructure 100, infrastructure management system 110, and/or other components of the system shown in FIG. 1.

At operation 300, a compliance information element for an infrastructure component is obtained. The compliance information element may be obtained from an agent. The agent may generate the compliance information element. The compliance information element may be obtained by (i) receiving it via a message, (ii) reading it from storage, and/or via other methods.

At operation 302, the compliance information element is dynamically processed to update a cross-standard compliance coverage model. The compliance information element may be dynamically processed by (i) identifying mappings associated with content of the compliance information element, (ii) identifying processing rules specified by the mappings, and (iii) processing the content of the compliance information elements based on the processing rules to update the state (e.g., compliance state indicating whether computing infrastructure complies with any number of standards) of the cross-standard compliance coverage model. The processing may update the state of compliance with any number of portions of standards of the cross-standard compliance coverage model. For example, as discussed above, changes in compliance with portions of a first standards may be used to automatically identify changes in portions of other standards (e.g., based on inter-standard mappings rather than compliance information element to standard mappings).

At operation 304, compliance standard data for a security standard is obtained using the updated cross-standard compliance coverage model. The compliance standard data may be obtained by (i) instantiating a data structure and (ii) populating the data structure with information reflecting compliance with the security standard based on corresponding portions of the cross-standard compliance coverage model. The resulting data structure may specify (i) portions of the security standard for which the security infrastructure is in compliance and/or (ii) other portions of the security standard for which the security infrastructure is out of compliance.

At operation 306, a determination is made regarding whether a change in compliance of the computing infrastructure has occurred. The determination may be made based on the compliance standard data. For example, if the compliance standard data indicates that the computing infrastructure has fallen out of compliance with one or more portions of one or more standards, then it may be determined that a compliance change has occurred.

If a compliance change has occurred, then the method may proceed to operation 308. Otherwise the method may end following operation 306.

At operation 308, an action set may be performed to manage an impact of change in compliance of the computing infrastructure. The action set may be performed by identifying actions to be performed based on one or more compliance failures specified by the compliance standard data. The actions may include, for example, sending notification or other types of information regarding the compliance failures to one or more recipients (e.g., administrators, decision makers, etc.), documenting the compliance failures, initiating automatic attempts to remediate the compliance failures, initiating shut down/quarantining/other actions to limit exposure of the portions of the computing infrastructure that has failed compliance with the standards, and/or other actions that may reduce the impact of the compliance changes. The actions may be identified by, for example, performing a lookup in a data structure that specifies actions to be performed for different types of compliance failures/changes in compliance. Performance of the actions may then be initiated (e.g., by generating and sending instructions regarding the actions to entities tasked with performing the actions).

The method may end following operation 308.

Turning to FIG. 4, a flow diagram illustrating a method for obtaining compliance information elements in accordance with an embodiment is shown. The method may be performed in part by computing infrastructure 100, infrastructure management system 110, and/or other components of the system shown in FIG. 1.

At operation 400, an infrastructure component may be identified for standard monitoring. The infrastructure component may be identified by (i) receiving information regarding the infrastructure component from another entities, (ii) by reading the information from storage, (iii) by obtaining user input indicating the infrastructure components, and/or via other methods.

At operation 402, mappings of a cross-standard compliance coverage model related to the infrastructure components are identified. The mappings may be identified based on a type of the infrastructure component. Mappings of the cross-standard compliance coverage model may be associated with different types of infrastructure components. The mappings may be identified based on the associations.

At operation 404, a configuration for an agent for the infrastructure component is generated based on the identified mappings. The configuration for the agent may be generated by (i) instantiating a data structure, (ii) populating the data structure with information regarding quantities used by the mappings to identify compliance with standards of the cross-standard compliance coverage model, and/or (iii) populating the data structure with information regarding a format for compliance information elements.

At operation 406, operation of an instance of the agent associated with the infrastructure component is updated based on the configuration. The operation of the instance of the agent may be updated by (i) providing the instance of the agent with the data structure (e.g., the agent may self-configure), (ii) providing a control plane or other management entity with the data structure (e.g., which may configure the operation of the agent using the data structure), (iii) by instantiating the agent with the data structure (e.g., by sending instructions to a data processing system that hosts the infrastructure component), and/or via other methods.

The method may end following operation 406.

Once configured, the agent may collect information as specified by the configuration, may generate compliance information elements as specified by the configuration, and may forward or otherwise provide the compliance information elements to other entities for use.

Using the methods illustrated in FIGS. 3-4, embodiments disclosed here may facilitate near real time compliance analysis for computing infrastructure. The compliance analysis may then be used to manage the impact of changes in compliance. Consequently, computer implemented services by the compliance infrastructure may be more likely to meet expectations.

Figure 5:
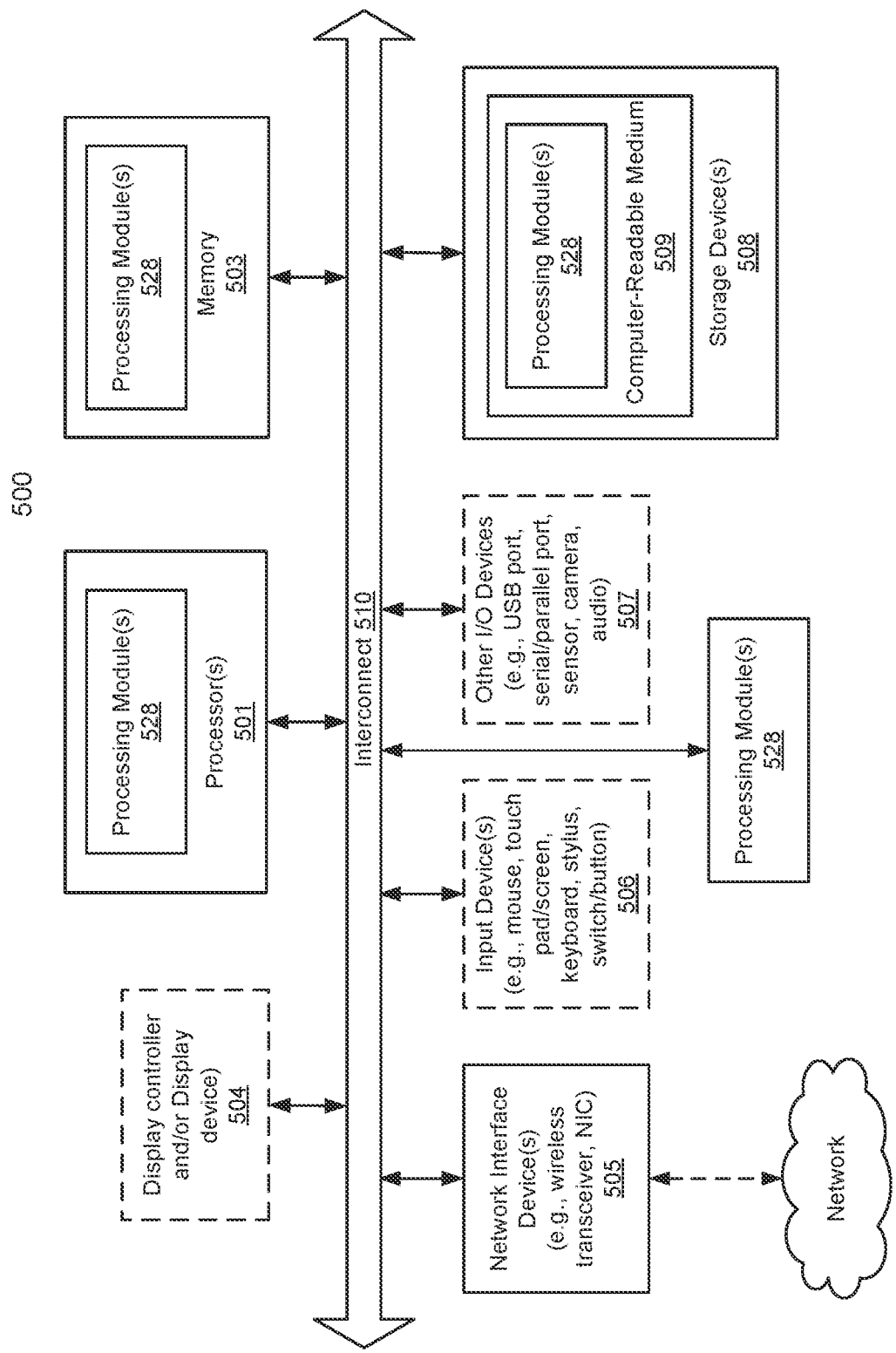
FIG. 5 shows a block diagram illustrating a data processing system in accordance with an embodiment.

Any of the components illustrated in FIGS. 1-2D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing computing infrastructure, the method comprising:
    obtaining a compliance information element for an infrastructure component of the computing infrastructure;
    dynamically processing the compliance information element obtained for the infrastructure component to update a cross-standard compliance coverage model to obtain an updated cross-standard compliance coverage model;
    obtaining compliance standard data for a security standard enforced on the computing infrastructure using the updated cross-standard compliance coverage model;
    making a determination, based on the compliance standard data obtained using the updated cross-standard compliance coverage model, whether the computing infrastructure has undergone a change in compliance with the security standard;
    in an instance of the determination made based on the compliance standard data obtained using the updated cross-standard compliance coverage model where the computing infrastructure has undergone the change in compliance with the security standard resulting in a compliance failure specified by the standard compliance data:
        performing an action set to manage an impact of the change in compliance with the security standard that the computing infrastructure has undergone and to reduce a divergence of an operation of the computing infrastructure from the security standard enforced on the computing infrastructure.

2. The method of claim 1, wherein the compliance information element is based on at least one mapping of the cross-standard compliance coverage model, the mapping associating the compliance information element with at least one portion of the security standard.

3. The method of claim 2, wherein the mapping further specifies a basis for a portion of a state of the cross-standard compliance coverage model associated with the portion of the security standard on the compliance information element.

4. The method of claim 3, wherein dynamically processing the compliance information element comprises:
    updating the portion of the state using the basis and the compliance information element; and
    updating a second portion of the state using a second basis associated with a second mapping of the cross-standard compliance coverage model and the compliance information element.

5. The method of claim 4, wherein the second portion of the state is associated with a portion of second security standard that is different from the security standard.

6. The method of claim 4, further comprising:
    prior to obtaining the compliance information element:
        identifying the infrastructure component for standard monitoring;
        identifying the mapping as being related to the infrastructure component;
        generating a configuration for an agent for the infrastructure component; and
        updating operation of an instance of the agent associated with the infrastructure component based on the configuration.

7. The method of claim 6, wherein updating the operation of the instance of the agent comprises:
    specifying collection, by the instance of the agent, of a configuration of the infrastructure component;
    specifying collection, by the instance of the agent, a state of the infrastructure component;
    specifying collection, by the instance of the agent, an audit result for the infrastructure component; and
    specifying generation, by the instance of the agent, of the compliance information element based on the configuration, the state, and/or the audit result.

8. A non-transitory machine-readable medium having instructions stored therein, which when executed by a processor, cause the processor to perform operations for managing computing infrastructure, the operations comprising:
    obtaining a compliance information element for an infrastructure component of the computing infrastructure;
    dynamically processing the compliance information element obtained for the infrastructure component to update a cross-standard compliance coverage model to obtain an updated cross-standard compliance coverage model;
    obtaining compliance standard data for a security standard enforced on the computing infrastructure using the updated cross-standard compliance coverage model;
    making a determination, based on the compliance standard data obtained using the updated cross-standard compliance coverage model, whether the computing infrastructure has undergone a change in compliance with the security standard;
    in an instance of the determination made based on the compliance standard data obtained using the updated cross-standard compliance coverage model where the computing infrastructure has undergone the change in compliance with the security standard resulting in a compliance failure specified by the standard compliance data:
        performing an action set to manage an impact of the change in compliance with the security standard that the computing infrastructure has undergone and to reduce a divergence of an operation of the computing infrastructure from the security standard enforced on the computing infrastructure.

9. The non-transitory machine-readable medium of claim 8, wherein the compliance information element is based on at least one mapping of the cross-standard compliance coverage model, the mapping associating the compliance information element with at least one portion of the security standard.

10. The non-transitory machine-readable medium of claim 9, wherein the mapping further specifies a basis for a portion of a state of the cross-standard compliance coverage model associated with the portion of the security standard on the compliance information element.

11. The non-transitory machine-readable medium of claim 10, wherein dynamically processing the compliance information element comprises:
updating the portion of the state using the basis and the compliance information element; and
updating a second portion of the state using a second basis associated with a second mapping of the cross-standard compliance coverage model and the compliance information element.

12. The non-transitory machine-readable medium of claim 11, wherein the second portion of the state is associated with a portion of second security standard that is different from the security standard.

13. The non-transitory machine-readable medium of claim 11, wherein the operations further comprise:
prior to obtaining the compliance information element:
identifying the infrastructure component for standard monitoring;
identifying the mapping as being related to the infrastructure component;
generating a configuration for an agent for the infrastructure component; and
updating operation of an instance of the agent associated with the infrastructure component based on the configuration.

14. The non-transitory machine-readable medium of claim 13, wherein updating the operation of the instance of the agent comprises:
specifying collection, by the instance of the agent, of a configuration of the infrastructure component;
specifying collection, by the instance of the agent, a state of the infrastructure component;
specifying collection, by the instance of the agent, an audit result for the infrastructure component; and
specifying generation, by the instance of the agent, of the compliance information element based on the configuration, the state, and/or the audit result.

15. A data processing system, comprising:
a processor; and
a memory coupled to the processor to store instructions, which when executed by the processor, cause the processor to perform operations for managing computing infrastructure, the operations comprising:
obtaining a compliance information element for an infrastructure component of the computing infrastructure;
dynamically processing the compliance information obtained for the infrastructure component element to update a cross-standard compliance coverage model to obtain an updated cross-standard compliance coverage model;
obtaining compliance standard data for a security standard enforced on the computing infrastructure using the updated cross-standard compliance coverage model;
making a determination, based on the compliance standard data obtained using the updated cross-standard compliance coverage model, whether the computing infrastructure has undergone a change in compliance with the security standard;
in an instance of the determination made based on the compliance standard data obtained using the updated cross-standard compliance coverage model where the computing infrastructure has undergone the change in compliance with the security standard resulting in a compliance failure specified by the standard compliance data:
performing an action set to manage an impact of the change in compliance with the security standard that the computing infrastructure has undergone and to reduce a divergence of an operation of the computing infrastructure from the security standard enforced on the computing infrastructure.

16. The data processing system of claim 15, wherein the compliance information element is based on at least one mapping of the cross-standard compliance coverage model, the mapping associating the compliance information element with at least one portion of the security standard.

17. The data processing system of claim 16, wherein the mapping further specifies a basis for a portion of a state of the cross-standard compliance coverage model associated with the portion of the security standard on the compliance information element.

18. The data processing system of claim 17, wherein dynamically processing the compliance information element comprises:
updating the portion of the state using the basis and the compliance information element; and
updating a second portion of the state using a second basis associated with a second mapping of the cross-standard compliance coverage model and the compliance information element.

19. The data processing system of claim 18, wherein the operations further comprise:
prior to obtaining the compliance information element:
identifying the infrastructure component for standard monitoring;
identifying the mapping as being related to the infrastructure component;
generating a configuration for an agent for the infrastructure component; and
updating operation of an instance of the agent associated with the infrastructure component based on the configuration.

20. The data processing system of claim 19, wherein updating the operation of the instance of the agent comprises:
specifying collection, by the instance of the agent, of a configuration of the infrastructure component;
specifying collection, by the instance of the agent, a state of the infrastructure component;
specifying collection, by the instance of the agent, an audit result for the infrastructure component; and
specifying generation, by the instance of the agent, of the compliance information element based on the configuration, the state, and/or the audit result.

* * * * *